United States Patent [19]
Richter et al.

[11] 4,080,185
[45] Mar. 21, 1978

[54] COMPOSITE FILTER SET FOR GAS FLOW DUCTS

[75] Inventors: Joachim Richter, Dusseldorf; Kurt Huber; Rolf Schneider, both of Weinheim an der Bergstrasse; Peter Rutsch, Abtsteinach, all of Germany

[73] Assignee: Firma Carl Freudenberg, Weinheim an der Bergstrasse, Germany

[21] Appl. No.: 723,829

[22] Filed: Sep. 16, 1976

[30] Foreign Application Priority Data
Sep. 25, 1975 Germany .................. 7530381[U]

[51] Int. Cl.² ............................................ B01D 46/02
[52] U.S. Cl. ................................. 55/379; 55/381; 55/483; 55/484; 55/500
[58] Field of Search ............... 55/381, 378, 379, 483, 55/484, 500, 521, 502, 497, 499, 382; 210/493

[56] References Cited
U.S. PATENT DOCUMENTS

| | | | |
|---|---|---|---|
| 2,050,508 | 8/1936 | Strindberg | 55/483 |
| 3,026,967 | 3/1962 | Stevens et al. | 55/500 |
| 3,160,908 | 12/1964 | Peabody et al. | 55/379 |
| 3,190,059 | 6/1965 | Bauder et al. | 55/499 |
| 3,247,652 | 4/1966 | Annas et al. | 55/483 |
| 3,873,286 | 3/1975 | Wurtenberg | 55/483 |

*Primary Examiner*—Bernard Nozick
*Attorney, Agent, or Firm*—Burgess, Dinklage & Sprung

[57] ABSTRACT

Across the gas flow path in a duct such as for air conditioning there is placed a composite filter set comprising a plurality of filter elements and means joining said elements, each of said filter elements comprising a plurality of filter pockets and a frame holding said pockets at their open ends, and said joining means connecting the frames of adjacent filter elements in a manner to form a gas-tight seal therebetween so that flowing gas can advance only by passage through one of said filter pockets.

1 Claim, 3 Drawing Figures

COMPOSITE FILTER SET FOR GAS FLOW DUCTS

BACKGROUND

The invention relates to a set of filters for use in existing filter walls, and especially in the duct systems of ventilating installations.

In the air conditioning and ventilating field there is often a need for the cleaning of the air. Frequently the dusts involved are of relatively small quantity, but in the ventilation, for example, of electrical switchgear or of lacquer spray booths, they can be a considerable nuisance.

In German Petty Pat. 6,913,804 there is described a housing which can be inserted between sections of ventilation duct and which accommodates bag filters or pocket filters for the cleaning of air or gases. This housing is a duct section of compact construction and standardized cross section in which a high-surface-area filter of known construction is pivotingly installed, and which is installed as a complete unit in an existing system. For numerous existing systems, however, it has proven to be unsatisfactory, especially since the air ducts in a great number of cases have non-standard duct cross sections. A considerable loss of regularly usable filter area is therefore often unavoidable. A special difficulty is furthermore to be seen in the fact that, in most filters of this type of construction, it is not possible to examine newly installed filter mats for leaks, especially in the marginal areas, and such leaks can result in undetected penetration of dust.

In the effort to fill the entire cross section of existing filter walls with filter elements and at the same time assure a leakproof joining together of the filter mats, a system has become known recently in which filter elements based on standardized outside dimensions and of similar external shape are used. In these filter elements it is no longer just the filter mat that is replaced when it is dirty, but the filter medium is in the form of self-supporting pockets fastened to a head frame at their open end, and is replaced together with the head frame.

The coverage of existing areas have been improved by having, in addition to the filter element equipped with a square head frame, filter elements which are provided with a rectangular head frame which covers half of the square-shaped area of the standard frame.

Since the filter pockets of such filter elements have self-supporting properties only if they are held in an upright position, it was necessary in this system to have some rectangular elements available whose pockets are arranged parallel to the long sides of the rectangle, and some whose pockets are arranged transversely of the long sides. Nevertheless a satisfactory filtering action has not yet been achieved by means of this system. Evidently due to insufficient static and dynamic stiffening, uncontrolled fluttering and ballooning movement of the filter pockets occurred, resulting in fibers coming loose from the cut edges and in a loss of active filter surface.

THE INVENTION

The invention is addressed to the problems of developing a filter set with which any area, especially the cross sections of existing duct systems, can be most simply covered, and by whose use an absolutely leakproof mounting of the filter medium is assured, while avoiding the disadvantages described above.

This problem is solved in accordance with the invention by a filter set for use in existing filter walls and especially in duct systems of ventilating installations, which is characterized by the combination:
1. Of an entire filter element consisting of a varying number of known filter pockets into which flexible trapezoidal reinforcing inserts are welded and which are fastened releasably or permanently at the front end to a square head frame,
2. A filter element of the same construction in which, however, the dimensions of the head frame are reduced such that four of these filter elements attain the size of the head frame of the first filter element when they are
3. Joined together by an interposed joining piece of appropriate cross-sectional shape, in a dust-tight manner.

The invention will be further described with reference to the accompanying drawings, wherein.

Figure 1:
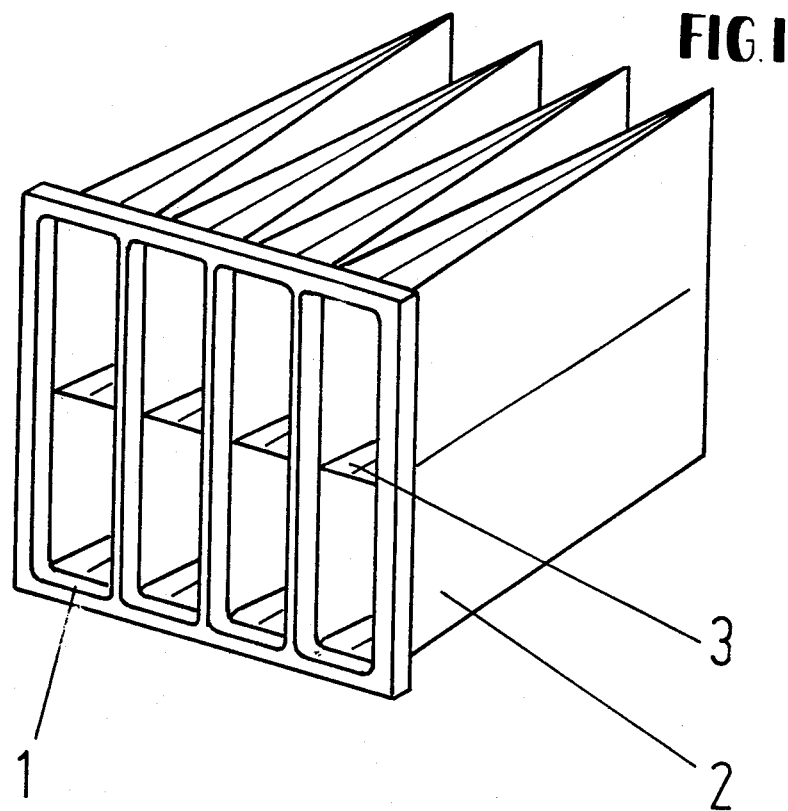
FIG. 1 is a perspective view of one filter element making up a filter set in accordance with the present invention.
Figure 2:
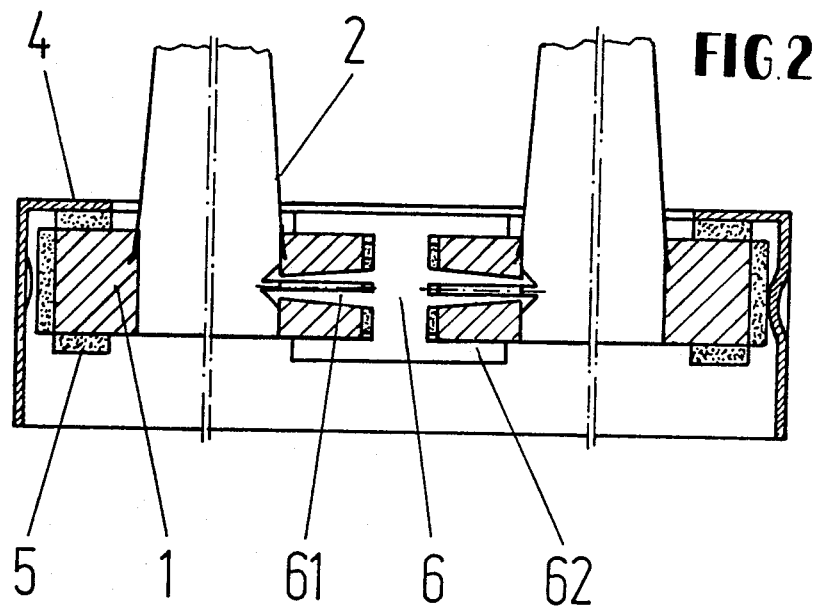
FIG. 2 is a schematic sectional view showing several elements according to claim 1 joined to one another and held in a set frame.

Referring now more particularly to the drawings, FIG. 2 shows a filter element which is used preferentially in accordance with the invention. This consists of a head frame 1 to which a varying number of filter pockets 2 is permanently joined. The filter pockets 2 are ordinarily stiffened by reinforcing inserts 3. The head frame 1 is of square shape and can best correspond in its outside dimensions to the known grid dimensions of conventional high-surface-area filters.

The filter set of the invention contains, in addition to this standard size, another size, the sole distinction between the two filter elements being that the head frame of the smaller unit corresponds in its outside dimensions approximately to one-fourth of the standard frame. An existing filter area is covered in accordance with the invention in the manner described below.

By means of frame sections 4 the given area is divided into whole, half and quarter fields.

As shown in FIG. 2, the head frames 1 of two filter elements are joined to one another by a gas-tight joining member 6, the joined elements being held by a frame 4 for the set, the joined elements being provided with foam strips 5 or sealing lips, at least on the mounting surfaces where they contact set frame 4.

In a framework erected in this manner, the above-described filter elements are clamped together. For a half field, two quarter elements are used, being previously assembled into half units by means of the joining piece 6. Drilling of the frame 1 to accommodate a pin 61 can be avoided if the frame 1 consists of hard foam and the pin 61 is given an appropriate configuration. Splitting of the frame can be prevented most simply by making the joining piece 6 H-shaped 62.

Figure 3:
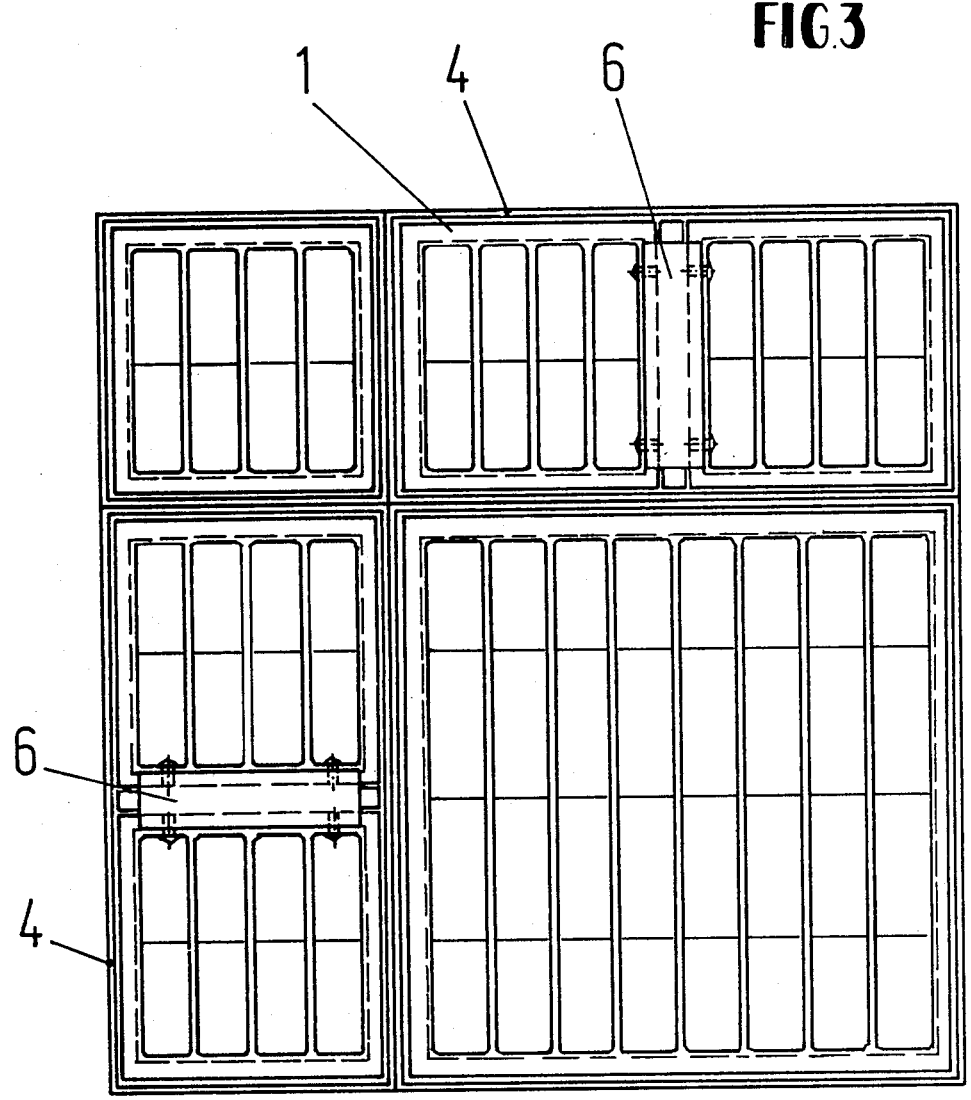
FIG. 3 is a front view showing a plurality of assembled sets according to FIG. 2 for filling out a flow path.

FIG. 3 shows by way of example the filling of an existing duct cross section with six filter elements of which five are of one size and one is of a larger size. Of the five smaller elements, two groups of two are joined into composite filter sets as shown in FIG. 2.

The advantages achievable with the filter set in accordance with the invention are to be seen especially in the fact that, with only two sizes of filter, a wide variety of filter areas can be largely covered, it being possible to arrange the pockets in the upright position when installed, and, by additional reinforcement, to give them a statically and dynamically stable performance, resulting in outstanding filtration efficiency.

It will be appreciated that the instant specification and examples are set forth by way of illustration and not limitation, and that various modifications and changes may be made without departing from the spirit and scope of the present invention.

What is claimed is:

1. A composite filter set for use in existing walls and especially in duct systems of ventilating installations, comprising:
   a. a first filter element comprising a plurality of first unsupported prismatic filter pockets each having a given opening length and into which trapezoidal reinforcing inserts are welded and a first square head frame holding the pockets at their open ends in substantially the same plane with the closed ends projecting outwardly in the same direction,
   b. a plurality of second filter elements each having the same construction as the first filter element and each including at least one second pocket having half the opening length dimension as said first filter pockets and a second square head frame having one-fourth the area of said first square head frame, and
   c. means joining at least two second frames around the periphery of the first frame in substantially the same plane and with the filter pockets projecting in the same direction and in a manner to form a gas-tight seal therebetween and to closely fit within the cross section of the duct.

* * * * *